United States Patent [19]
Pal

[11] Patent Number: 5,373,703
[45] Date of Patent: Dec. 20, 1994

[54] KAR-KOOL

[76] Inventor: Arun K. Pal, 1925 E. Van Buren, Phoenix, Ariz. 85006-3755

[21] Appl. No.: 55,373

[22] Filed: May 3, 1993

Related U.S. Application Data

[63] Continuation-in-part of Ser. No. 552,542, Sep. 6, 1990, abandoned.

[51] Int. Cl.⁵ .................. F24F 1/00; B60H 1/32
[52] U.S. Cl. ........................... 62/91; 62/239; 62/244; 62/259.1
[58] Field of Search ........... 62/235.1, 239, 244, 62/259.1, 91; 454/131, 900

[56] References Cited

U.S. PATENT DOCUMENTS

| | | | |
|---|---|---|---|
| 2,767,638 | 10/1956 | Davis | 454/131 |
| 3,943,726 | 3/1976 | Miller | 62/235.1 |
| 4,142,678 | 3/1979 | Bottum | 62/235.1 X |
| 4,658,597 | 4/1987 | Shum | 62/235.1 |
| 4,658,599 | 4/1987 | Kajiwara | 62/235.1 X |
| 4,800,803 | 1/1989 | Farmont | 454/900 X |
| 4,955,203 | 9/1990 | Sundhar | 62/235.1 X |
| 4,970,876 | 11/1990 | Vinokurov | 62/304 |
| 4,986,169 | 1/1991 | Chen | 454/900 X |
| 5,003,866 | 4/1991 | Ricci | 454/900 X |
| 5,005,367 | 4/1991 | Hwang | 62/244 X |
| 5,038,576 | 8/1991 | Hwang | 62/244 |
| 5,081,912 | 1/1992 | Clenet | 454/900 X |
| 5,094,151 | 3/1992 | Bernard | 454/131 |
| 5,099,752 | 3/1992 | Bosley | 454/131 |

FOREIGN PATENT DOCUMENTS

| | | | |
|---|---|---|---|
| 27760 | 4/1981 | European Pat. Off. | 62/244 |
| 2330976 | 6/1974 | Germany | 454/337 |
| 2952080 | 6/1981 | Germany | 62/244 |
| 51141 | 4/1979 | Japan | 62/235.1 |
| 26943 | 2/1983 | Japan | 62/259.4 |
| 252021 | 12/1985 | Japan | 62/235.1 |
| 252022 | 12/1985 | Japan | 62/235.1 |
| 252024 | 12/1985 | Japan | 62/235.1 |
| 255527 | 12/1985 | Japan | 62/235.1 |
| 255528 | 12/1985 | Japan | 62/235.1 |
| 84032 | 3/1989 | Japan | 62/259.4 |
| 266016 | 10/1989 | Japan | 62/259.4 |
| 2215034 | 9/1989 | United Kingdom | 454/131 |
| 929469 | 5/1982 | U.S.S.R. | 62/239 |

OTHER PUBLICATIONS

Watt, Dr. John R., "Evaporative Air Conditioning", 2nd Ed., Sep. 1986.

*Primary Examiner*—Christopher Kilner

[57] ABSTRACT

A cooling system for cooling the interior of an automobile comprising a refillable water reservoir stored on-board the automobile, a water atomizer for dispersing water directly into the interior of the automobile to absorb heat by evaporation, a device for selectively delivering water from the reservoir to the atomizer, a fan for circulating air within the interior using a solar or lighter socket power source, a manually detachable double sided clip for mounting the atomizer adjacent to the fan or to the built in ventilation of the automobile and an intrusion prevention device comprising a plurality of geometric pieces.

20 Claims, 7 Drawing Sheets

KAR-KOOL

"This is a continuation-in-part of copending application(s) Ser. No. 07/552,542 filed on Sep. 6, 1990, now abandoned".

BACKGROUND OF THE INVENTION

This device is used to keep a motor vehicle cabin cool when parked in a hot sunny day. It uses the latent heat of vaporization of a liquid such as water, combined with convection via forced air circulation. A second use for this device is to cool occupant(s) while vehicle is in transit by placing mist in front of built-in blowers in the dash of vehicle.

By November of 1992, "do-it-yourselfers" will no longer be able to charge their vehicles with chlorofluorocarbon based refrigerants. By 1995, chlorofluorocarbon based refrigerants will be banned for automotive use per the Clean Air Act. Owners will have to switch to a substitute which would require major alterations in chlorofluorocarbon based vehicle air conditioning system such as changing the compressor, metering device, etc. As a cost efficient alternative, "Kar-Kool" might be considered as it uses a coolant that does not pollute the environment, nor does it require major alterations. It has an added advantage in that "Kar-Kool" will keep the car cool while parked in the sun which present day air conditioners can't do. Further advantages offered by this device are: negligible gasoline consumption; less pollution due to the fact that gasoline is not combusted while vehicle is in parked position, and minimal gasoline is combusted while vehicle is in transit—the fuel consumption arising from the vehicle carrying the weight of "Kar-Kool"; lower maintenance cost, as one doesn't have to go to an EPA certified mechanic to recharge the air conditioning system; emergency water supply, in case of an overheated radiator, or being stranded in the desert, low capitol costs in manufacturing, and simplicity when compared to present day air conditioners.

SUMMARY OF INVENTION

The above and other objects are attained in an automobile through the utilization of combining water mist in front of a forced convection generator. Misting is accomplished by power from solar cells or vehicle battery or air pressure via bladder tank or a combination thereof, and forced convection generator. When vehicle is in transit, place atomizer in front of built-in blowers in the dash of vehicle; when vehicle is parked, place atomizer in front of window mounted fans. The water reservoir may be placed in the trunk or passenger compartment of motor vehicle. The power for the window mounted fans is solar energy, or vehicle battery. An intrusion prevention shroud which comprises of a plurality of adjustable geometric pieces connected by wire with plastic sheet attached to adjustable geometric pieces is used to fill in the gap created between the window and window frame by forced convection generator.

OBJECT OF INVENTION

It is an object of this invention to provide cooling of automotive interior while in transit, or parked in the sun.

It is another object of this invention to provide cooling using environmentally safe methodology.

DETAILED DESCRIPTION OF PREFERRED EMBODIMENTS

The cooler for automotive use in accordance with the present invention will hereunder be described with reference to the embodiments illustrated in the accompanying drawings.

Figure 1:
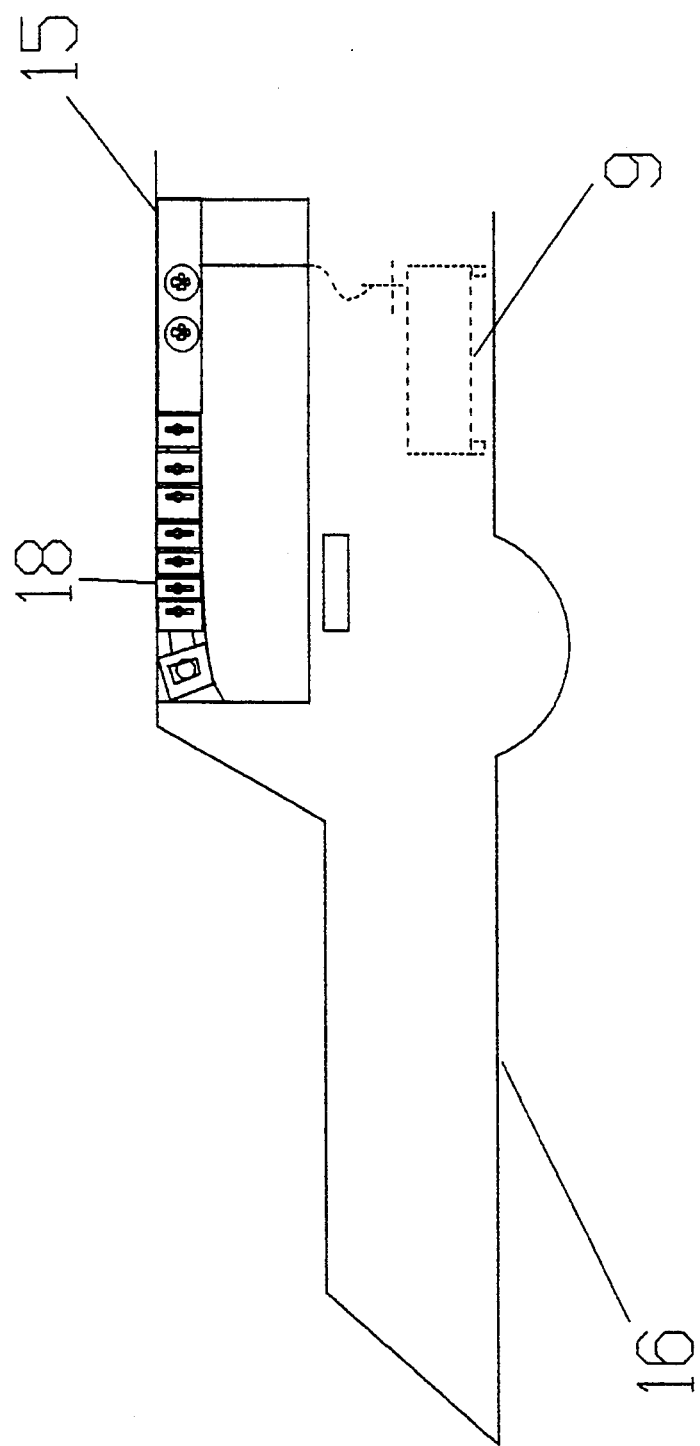
FIG. 1 is a view of an automotive cooling system showing a preferred embodiment of the present invention.

FIG. 1 shows the cooling system installed in a vehicle 16 where the water reservoir 9 is shown in the back seat area, and the fans 15 located in between window and window frame, and adjustable geometric pieces 18 which prevent entry into vehicle by intruder.

Figure 2:
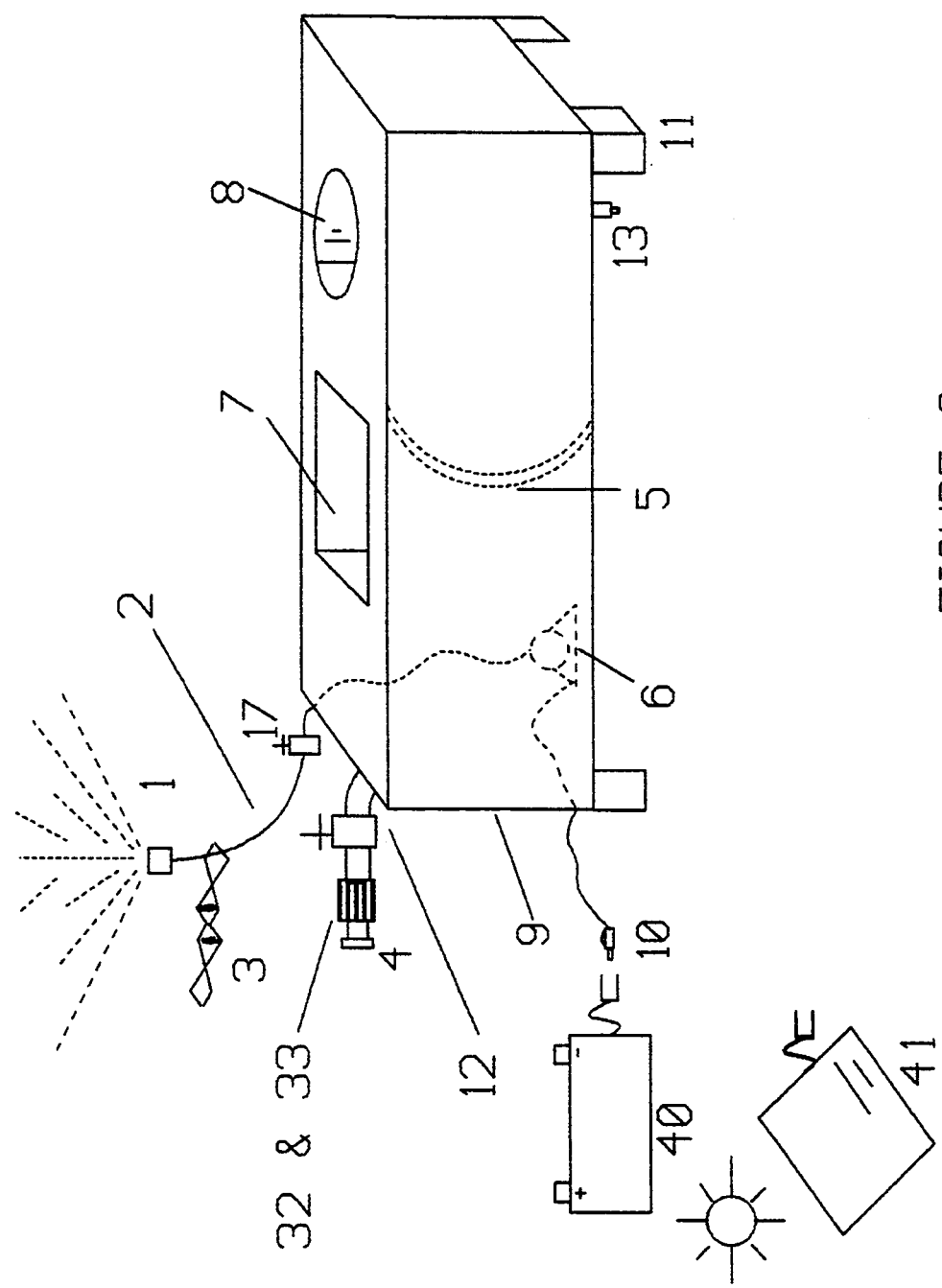
FIG. 2 is a detailed view of the reservoir used in the embodiment of FIG. 1.

FIG. 2 shows reservoir 9 comprising of an atomizer 1, a tube 2, double-sided clip 3 to hold the tube to a "pinchable" surface, valve 17 to discharge water through the atomizer 1, a water hose attachment 4, filtration 32 and chemical treatment 33 for inlet water, and accompanying valve 12, a diaphragm 5 to separate air from water, a pump 6, cubical 7 and cylindrical 8 cavities in the reservoir for holding miscellaneous items, a power cord 10 which is used to power the pump 6, where the power comes from solar cells, or vehicle electrical system, legs 11, and air inlet 13.

The automotive cooler described is operated in the following manner. Place the reservoir 9, in the trunk or luggage compartment of the vehicle, or in the back seat passenger compartment area, charge reservoir with water from a garden hose by screwing it into the female adaptor 4. Place fans 15 and accompanying intrusion prevention shroud(adjustable geometric pieces 18 connected by wire 14—FIG. 3—all of which are covered by plastic sheet 23—FIG. 4) in between window and window frame. While the vehicle is parked, insert receptacle cord 30 into a receptor connected to solar cells 41, or vehicle electrical system 40, turn on valve 17 which will atomize water, and place atomizer 1 in front of fans by attaching clip 3 to automobile interior(i.e. seat belt, seats, or any "pinchable area") such that spraying is occurring in front of the fans 15.

When the vehicle is in motion, in order to cool the driver, place the atomizer 1 in front of the built-in blowers by attaching double-edged clip 3 to the dash and the tube 2 which carries water to the atomizer. The forced convection from vehicle blowers combined with water spray has a cooling effect.

Figure 3:
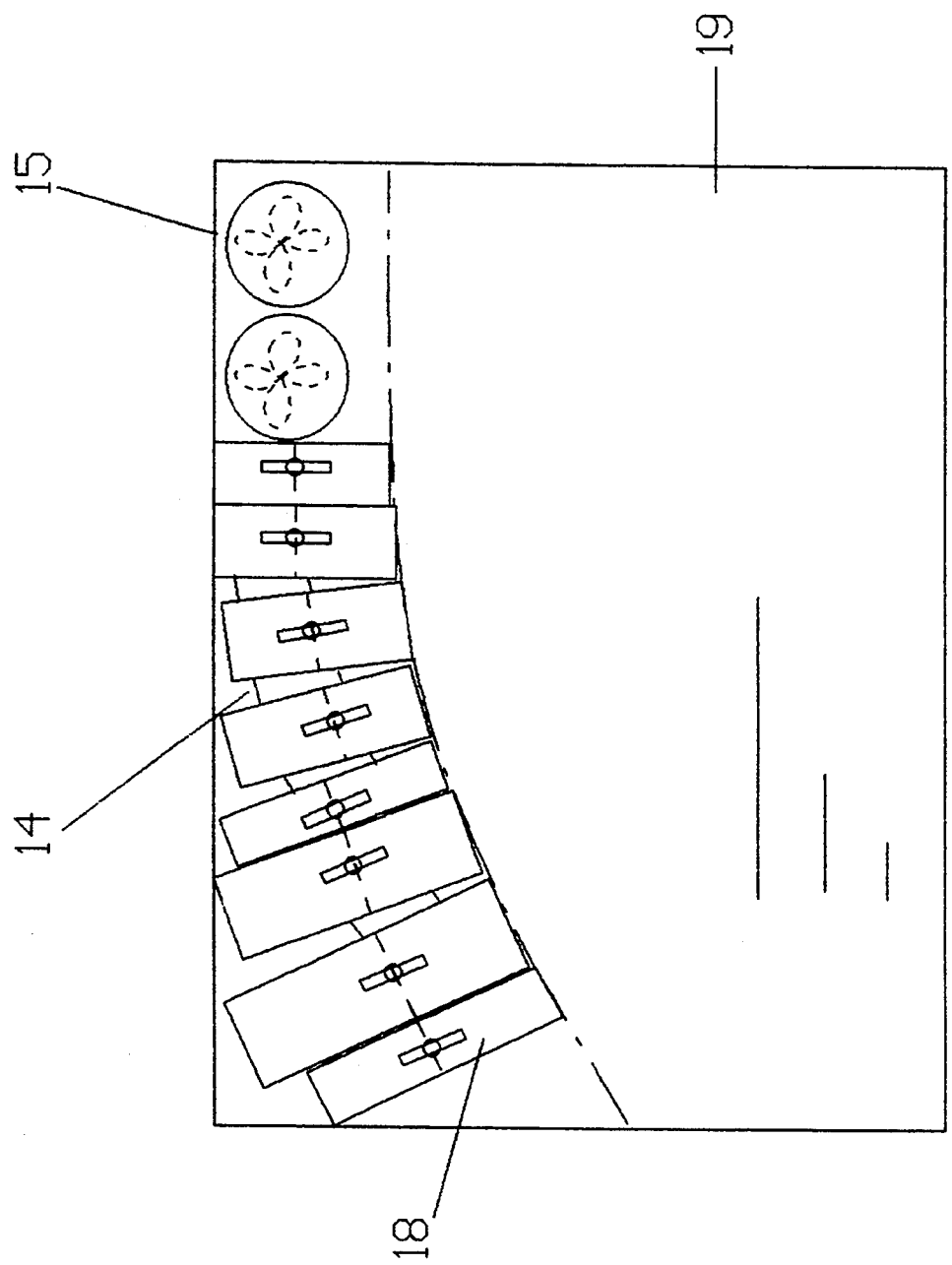
FIG. 3 is a detailed view of the fans and the intrusion prevention device used in the embodiment of FIG. 1.
Figure 4:
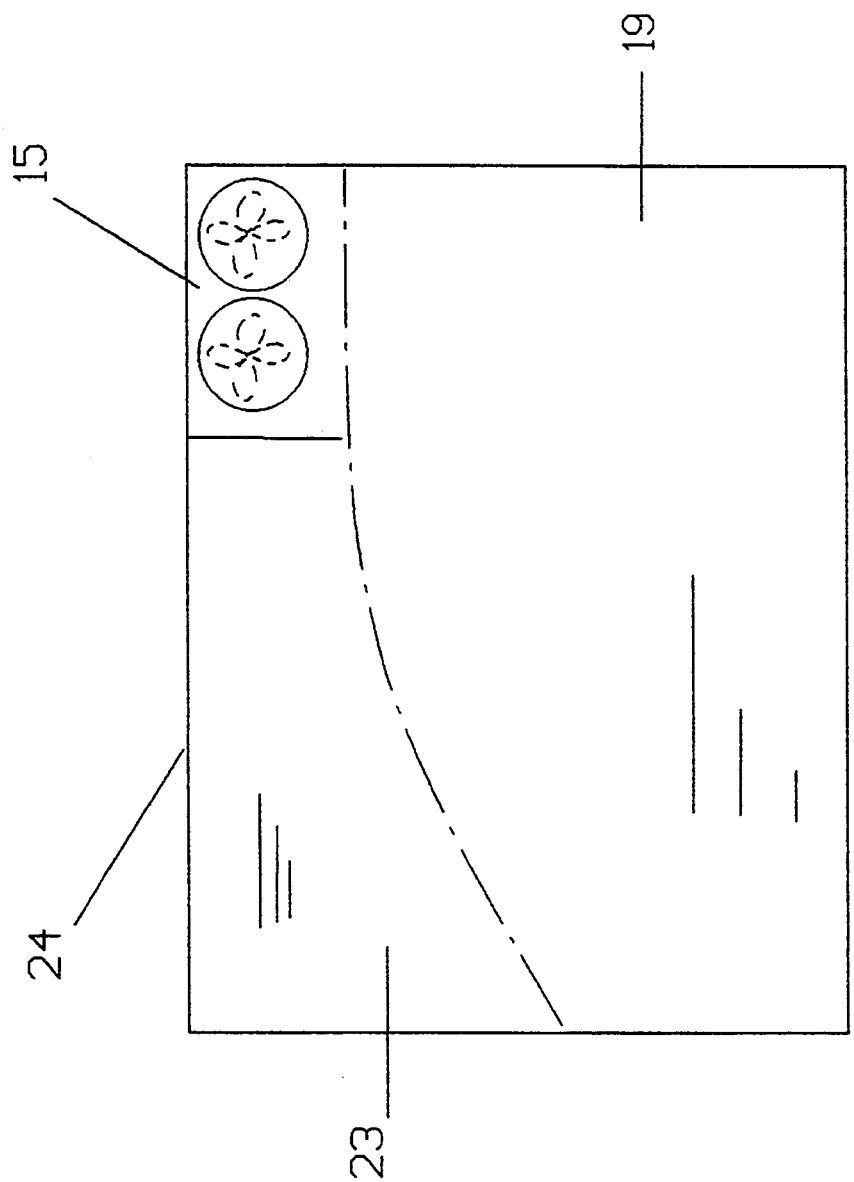
FIG. 4 is a detailed view of the fans and the intrusion prevention device used in the embodiment of FIG. 3 with a sheet covering the adjustable geometric pieces shown in FIG. 3.

FIG. 3 shows the intrusion prevention device, a combination of wire 14, adjustable geometric pieces 18, and sheet 23 (see FIG. 4) where adjustable geometric blocks are held together by wire 14. FIG. 4 shows fans 15, a sheet 23 which covers the plurality of adjustable geometric pieces 18 and wire 14, all of which are secured between window 19 and window frame 24.

Figure 5:
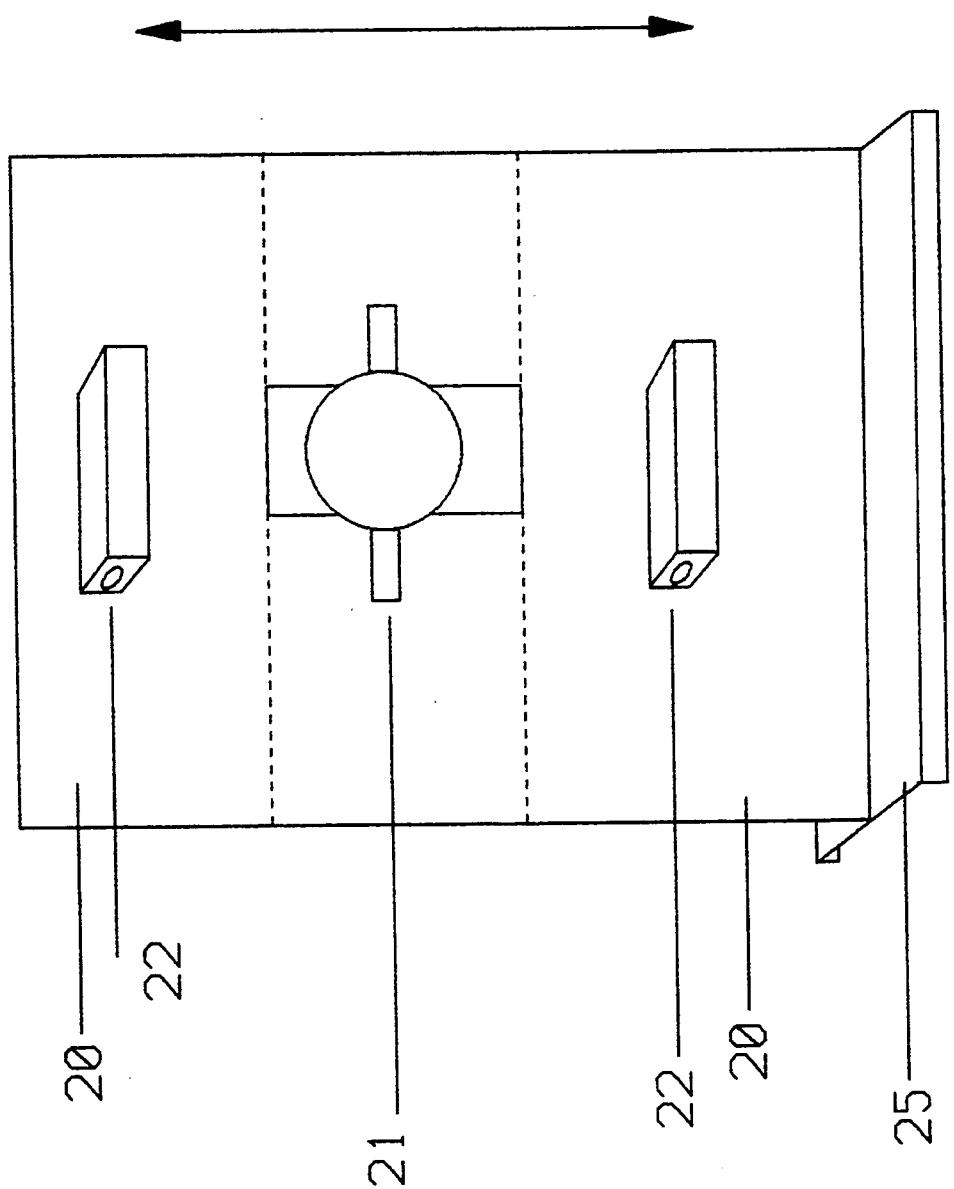
FIG. 5 is a detailed view of an adjustable geometric piece shown in FIGS. 1 and 3.

A detailed view of one of the adjustable geometric pieces 18 is shown in FIG. 5. These adjustable geometric pieces comprise of two smaller geometric pieces 20 with a slot, held together by a wing nut 21. Each geometric piece has a "wire threader" 22 through which wire 14 (seen in FIGS. 3 and 4) can be threaded to hold together the geometric pieces to form a skeleton of the intrusion prevention device. The bottom portion of the geometric piece has a "U" shaped channel 25 which is used to hold the geometric piece on to the window of the vehicle 16(seen in FIG. 1).

Figure 6:
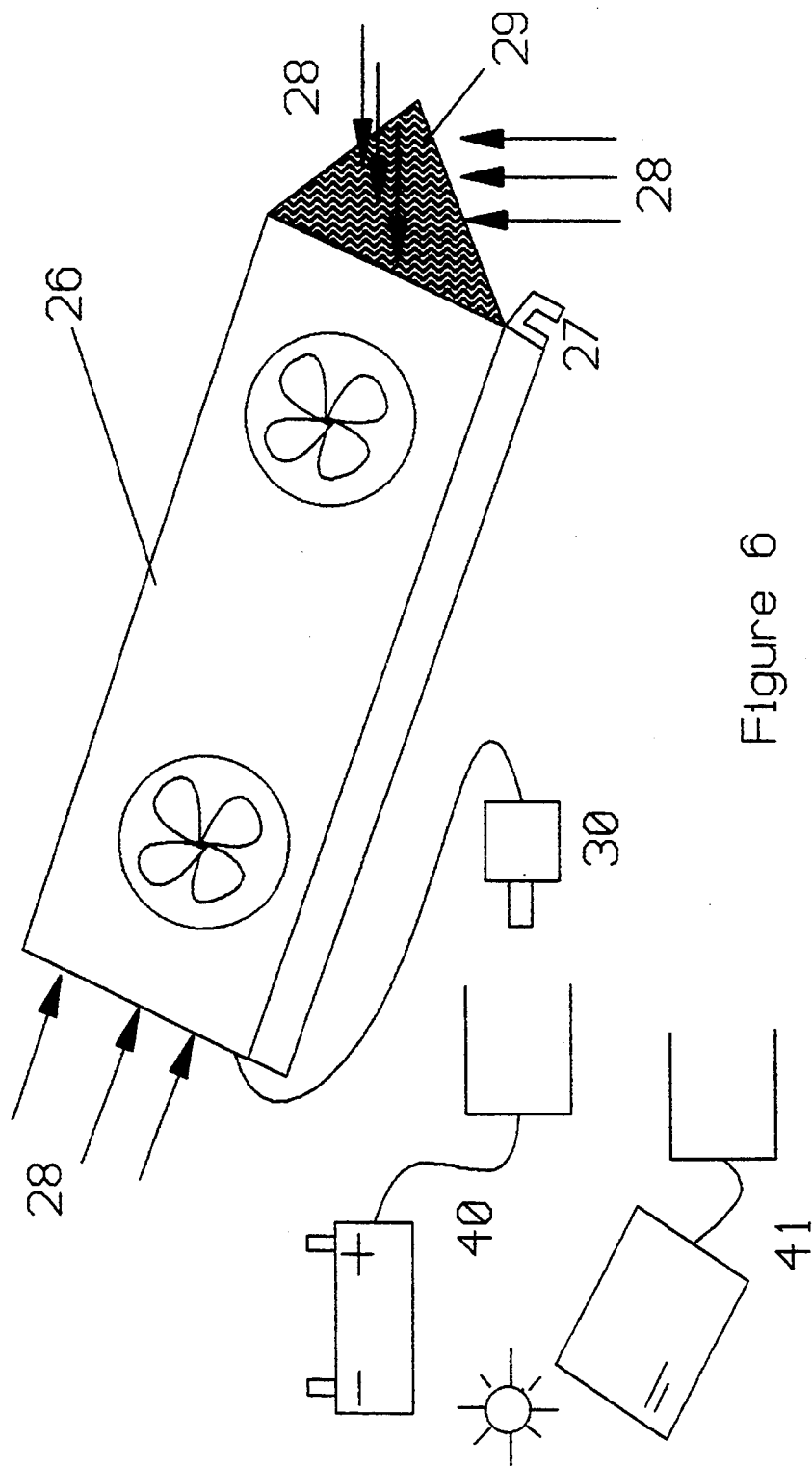
FIG. 6 shows the triangular housing for the fans shown in FIGS. 1, 3, and 4 along with a filter for fan air intake.

FIG. 6 shows fans 15(also seen in FIGS. 1, 3, and 4) housed in a triangular housing 26, with a cigarette lighter plug 30 for power, "U" shaped channel 27 for mounting on vehicle window, and air filter 29.

Figure 7:
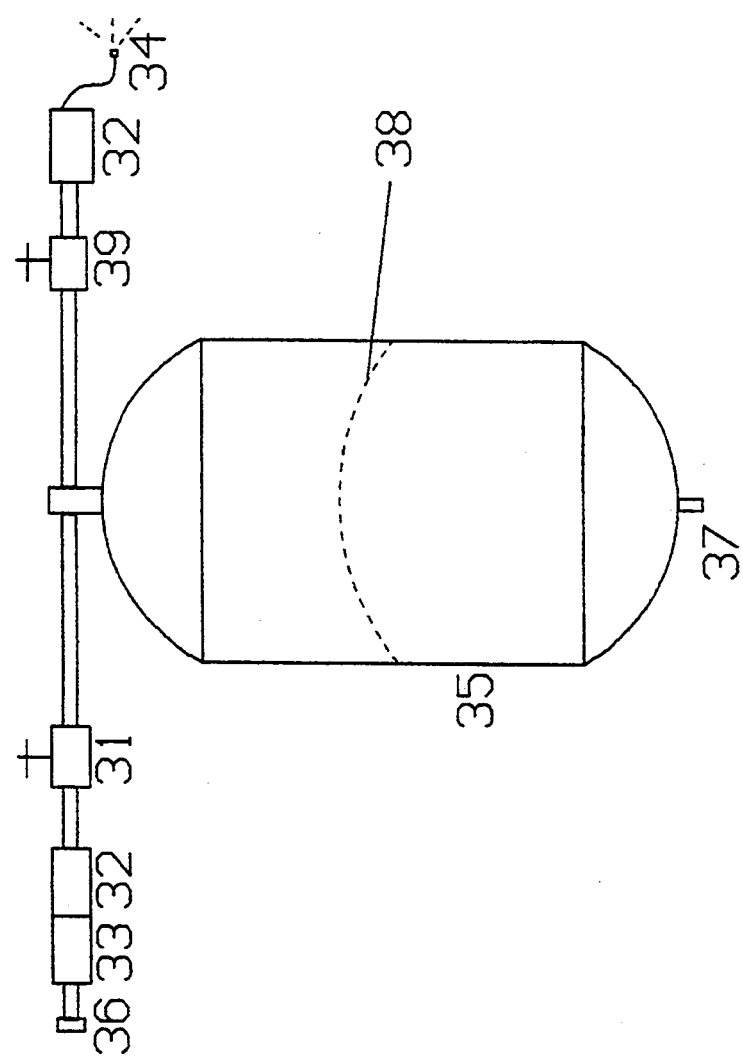
FIG. 7 shows a bladder tank that may be used in lieu of the tank shown in FIG. 2.

As an alternative to the type of tank depicted in FIG. 2, a bladder tank is shown in FIG. 7. Water is charged through port 36, chemically treated 33, filtered 32, and when fully charged, valve 31 is placed in the closed position. Water is discharged for the purposes of atomizing by opening valve 39 and passing through filter 32 to atomizer 34.

I claim:

1. A cooling system for cooling an interior of an automobile comprising:
    a refillable water reservoir stored onboard said automobile;
    a water atomizer means for dispersing said water directly into said interior of said automobile to absorb heat by evaporation;
    means for selectively delivering said water from said reservoir to said atomizer;
    air convection means for circulating air within said interior using an onboard power source; and
    manually detachable means for mounting said atomizer adjacent to said air convection means.

2. A cooling system according to claim 1 wherein said reservoir is stored in a passenger compartment of said automobile.

3. A cooling system according to claim 1 wherein said reservoir is stored in a luggage compartment of said automobile.

4. A cooling system according to claim 1 wherein said means for delivering water is a flexible tube and a selectively actuated pump intermediate said atomizer and said reservoir.

5. A cooling system according to claim 1 wherein said means for delivering water is a flexible tube and a selectively operated valve intermediate said atomizer and said reservoir and a pressurized bladder/diaphragm in said reservoir.

6. A cooling system according to claim 1 wherein said air convection means is a removable, window mounted fan unit.

7. A cooling system according to claim 1 wherein said air convection means is a dashboard mounted blower system.

8. A cooling system according to claim 1 wherein said onboard power source is an automobile electrical system.

9. A cooling system according to claim 1 wherein said onboard power source comprises solar cells.

10. A cooling system according to claim 6 wherein an anti-intrusion device, comprising a plurality of rigid geometric pieces adjacently secured to a wire by fasteners and with sheet material attached to said geometric pieces, is mounted adjacent to said fan unit to occlude an opening formed by mounting said fan unit in said window.

11. A cooling system according to claim 1 wherein said means for mounting comprises a double sided clip.

12. A method of cooling an interior of an automobile comprising:
    storing water in a refillable water reservoir onboard said automobile;
    selectively delivering said water from said reservoir to an atomizing means;
    atomizing said delivered water directly into said interior of said automobile to absorb heat by evaporation;
    circulating air within said interior using an air convection means powered by an onboard power source; and
    manually and detachably mounting said atomizing means adjacent to said air convection means.

13. The method of claim 12 further comprising pressurizing a bladder in said reservoir to supply a motive force for delivering said water.

14. The method of claim 12 further comprising mounting said air circulation means in an opening formed by a partially open window of said automobile.

15. The method of claim 12 further comprising powering said air convection means by using solar cells.

16. The method of claim 12 further comprising powering said air convection means by using said automobile's electrical system.

17. The method of claim 14 further comprising mounting an anti-intrusion device to occlude said opening's portion not occupied by said air circulation means.

18. The method of claim 12 further comprising storing said refillable reservoir in a passenger compartment of said automobile.

19. The method of claim 12 further comprising storing said refillable reservoir in a luggage compartment of said automobile.

20. The method of claim 12 further comprising mounting said atomizer adjacent said automobile's built in dash mounter blower system and operating said blower system to act as said air convection means.

* * * * *